(12) United States Patent
Kojima et al.

(10) Patent No.: US 6,578,063 B1
(45) Date of Patent: Jun. 10, 2003

(54) 5-TO-2 BINARY ADDER

(75) Inventors: Nobuo Kojima, Austin, TX (US);
Ohsang Kwon, Austin, TX (US);
Kevin John Nowka, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 09/584,893

(22) Filed: Jun. 1, 2000

(51) Int. Cl.[7] .............................................. G06F 7/50
(52) U.S. Cl. ...................................... 708/708; 708/709
(58) Field of Search ................................. 708/708, 709

(56) References Cited

U.S. PATENT DOCUMENTS

| | | | | | |
|---|---|---|---|---|---|
| 3,535,502 | A | * | 10/1970 | Clapper | 708/685 |
| 5,805,491 | A | * | 9/1998 | Bechade | 708/708 |
| 5,818,747 | A | * | 10/1998 | Wong | 708/702 |
| 6,308,195 | B1 | * | 10/2001 | Hirase et al. | 708/708 |
| 6,345,286 | B1 | * | 2/2002 | Dhong et al. | 708/708 |
| 2002/0038327 | A1 | * | 3/2002 | Ferroussat | 708/708 |
| 2002/0129077 | A1 | * | 9/2002 | Rhee | 708/708 |

OTHER PUBLICATIONS

Hsiao et al "Design of high–speed low–power 3–2 counter and 4–2 compressor for fast multipliers" Electronics Letters vol. 34 No. 4 pp. 341–343 Feb. 19, 1998.*

Mori et al., "A 10–NS 54×54–B Parallel Structured Full Array Multiplier with 0.5um CMOS Technology," IEEE Journal of Solid State Circuits, vol. 26, No. 4, 1991, pp. 600–606.

Law et al., "A Low–Power 16×16–B Parallel Multiplier Utilizing Pass–Transistor Logic", IEEE Journal of Solid State Circuits, vol. 34, No. 10, Oct. 1999, pp. 1395–1399.

Izumikawa et al., "A 0.25um CMOS 0.9–V 100–MHz DSP Core", IEEE Journal of Solid State Circuits, vol. 32, No. 1, Jan. 1997, pp. 52–61.

Yano et al., "A 3.8–ns CMOS 16×16–B Multiplier Using Complementary Pass–Transistor Logic", IEEE Journal of Solid State Circuits, vol. 25, No. 2, Apr. 1990, pp. 388–395.

Song et al., "Circuit and Architecture Trade–Offs for High–Speed Multiplication," IEEE Journal of Solid State Circuits, vol. 26, No. 9., Sep. 1991, pp. 1184–1198.

* cited by examiner

*Primary Examiner*—David H. Malzahn
(74) *Attorney, Agent, or Firm*—Casimer K. Salys; Bracewell & Patterson, L.L.P.

(57) ABSTRACT

A five-input/two-output binary adder is disclosed. The five-input/two-output adder includes five inputs and two outputs. Four levels of XOR logic gates are coupled between the five inputs and the two outputs for combining values received at the five inputs and generating a sum value and a carry value at the outputs.

10 Claims, 3 Drawing Sheets

5-TO-2 BINARY ADDER

BACKGROUND OF THE INVENTION

1. Technical Field

The present invention relates to an apparatus for data processing in general, and in particular to a binary adder. Still more particularly, the present invention relates to a five-input/two-output binary adder.

2. Description of the Prior Art

The two most commonly encountered binary adders in digital arithmetic circuit arrangements are carry-propagate adders (CPAs) and carry-save adders (CSAs). CPAs are typically designed to have two data inputs and one output. CPAs operate according to well-known principles in which addend bits of the same order are added together, and a carry bit will be transferred to an adjacent higher order bit when required. A sum is directly derived from a bit-by-bit addition, with an appropriate carry to an adjacent higher order bit and a single bit carry out from the highest order bit position. The ripple carry of a CPA tends to result in slow non-parallel operations because high order bits computations are dependent on the results from low order bits.

CSAs, on the other hand, typically have three data inputs and two outputs. Carry bits in CSAs are accumulated separately from the sum bits of any given order (or position). The output of CSAs are two vectors, namely, a sum and a carry, which when added together yield the final result. One benefit of CSAs is that high-order bits have no dependency on any low-order bit because all bit positions are calculated independently, thereby avoiding the propagation latency associated with carry bits in CPAs. Because of their speed and simplicity, CSAs are pervasively found in digital logic designs.

The present disclosure describes a five-input/two-output CSA adder. Such five-input/two-output CSA adder can be advantageously used in, for example, a fused multiply-adder that combine a multiplication operation with an add operation.

SUMMARY OF THE INVENTION

In accordance with a preferred embodiment of the present invention, a five-input/two-output binary adder includes five inputs and two outputs. Four levels of XOR logic gates are coupled between the five inputs and the two outputs for combining values received at the five inputs and generating a sum value and a carry value at the outputs.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
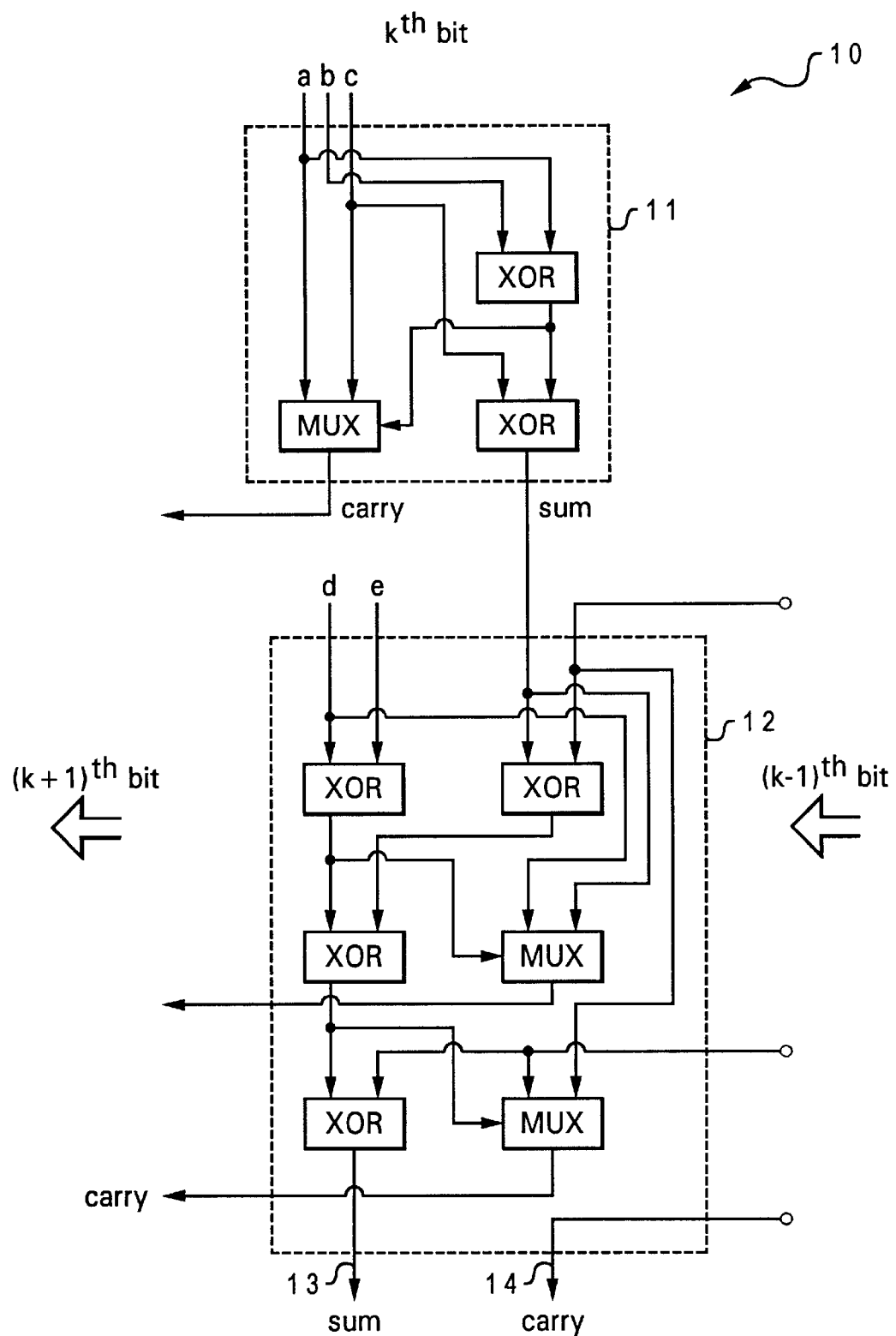
FIG. 1 is a block diagram of a direct implementation of a five-input/two-output adder.

A five-input/two-output adder is typically not readily available in a conventional logic gate library. However, a five-input/two-output adder can be formed by directly combining, for example, a three-input/two-output adder with a four-input/two-output adder. Referring now to the drawings and in particular to FIG. 1, there is illustrated a block diagram of a direct implementation of a five-input/two-output adder. As shown, a three-input/two-output adder 11 is coupled to a four-input/two-output adder 12 to form a five-input/two-output adder 10. Five-input/two-output adder 10 combines inputs a, b, c, d, and e to generate a sum output 13 and a carry output 14.

The time delay for five-input/two-output adder 10 can be qualitatively measured by the total number of levels of XOR gates utilized. Three-input/two-output adder 11 requires two levels of XOR gates, and four-input/two-output adder 12 requires three levels of XOR gates. Thus, five-input/two-output adder 10 requires a total of five levels of XOR gates. Because of the relatively long delay time associated with five level of XOR gates, it is not very attractive to realize a five-input/two-output adder by this type of direct implementation.

Figure 2:
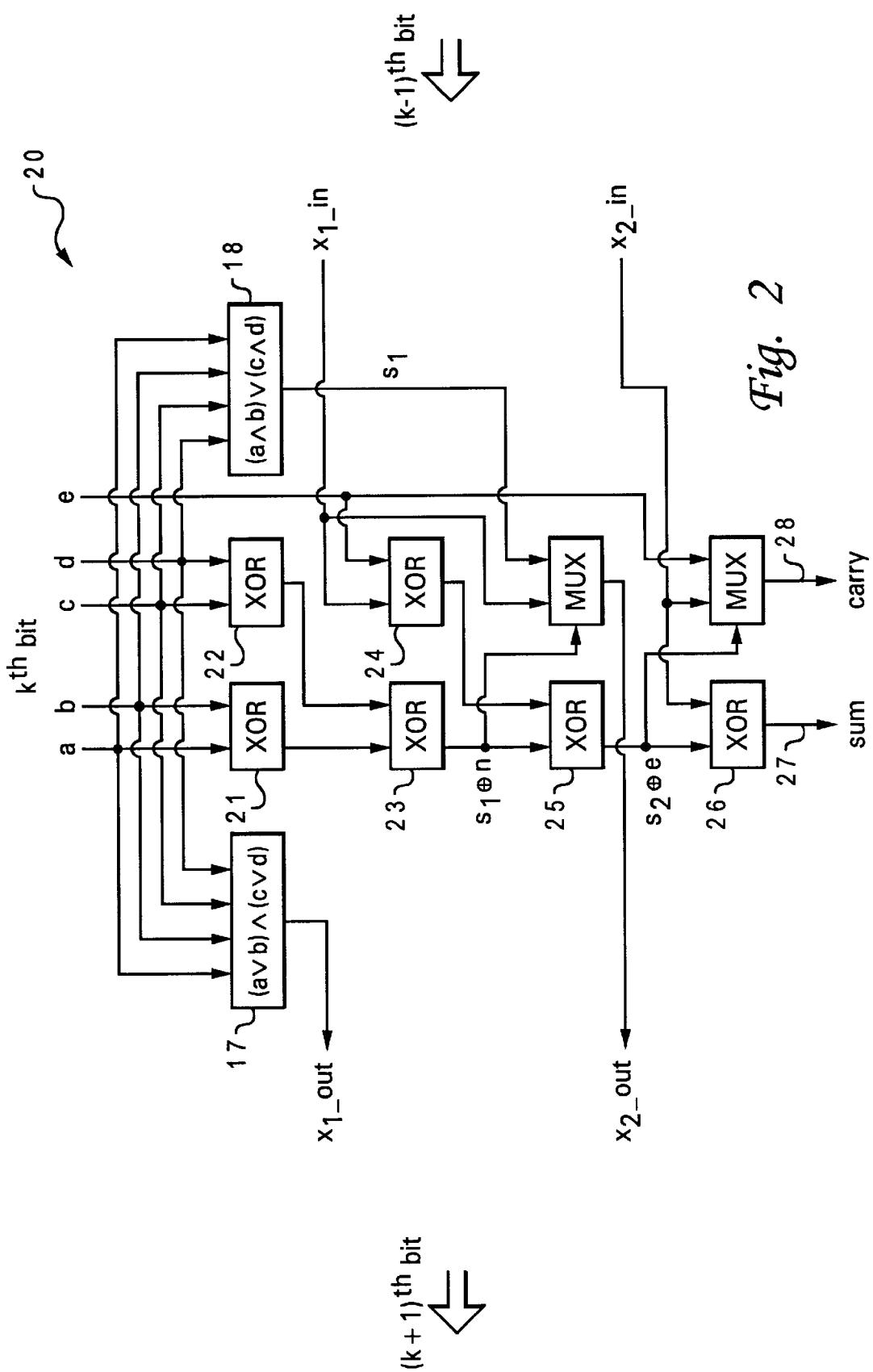
FIG. 2 is a block diagram of a five-input/two-output adder in accordance with a preferred embodiment of the present invention.

With reference now to FIG. 2, there is illustrated a block diagram of a five-input/two-output adder 20, in accordance with a preferred embodiment of the present invention. Similar to five-input/two-output adder 10, five-input/two-output adder 20 combines inputs a, b, c, d, and e to generate a sum output 27 and a carry output 28. However, five-input/two-output adder 20 only requires four levels of XOR gates. Specifically, at level one, an XOR gate 21 combines input a and input b, and an XOR gate 22 combines input c and input d. At level two, an XOR gate 23 combines the result from XOR gate 21 and XOR gate 22, and an XOR gate 24 combines input e and a first carry-out (i.e., $x1\_in$) from a previous stage of five-input/two-output adder 20. At level three, an XOR gate 25 combines the results from XOR gate 23 and XOR gate 24. At level four, an XOR gate 26 combines the results from XOR gate 25 and a second carry-out (i.e., $x2\_in$) from the previous stage of five-input/two-output adder 20. The logic operations shown within blocks 17 and 18 are preferably performed at level one in conjunction with XOR gates 21 and 22.

In order for five-input/two-output adder 20 to operate correctly, the following equation must be satisfied:

$$a+b+c+d+e+x1\_in+x2\_in=2(x1\_out+x2\_out+carry)+sum$$

For the convenience of illustration, various results of (a+b+c+d) are mapped out in Table I, where a, b, c, and d are input values of either a logical 0 or logical 1.

TABLE I

| a + b + c + d | other conditions | x1_out | n | s1 |
|---|---|---|---|---|
| 0 | | 0 | 0 | 0 |
| 1 | | 0 | 1 | 0 |
| 2 | (a and b) or (c and d) | 0 | 1 | 1 |
| 2 | (a or b) and (c or d) | 1 | 0 | 0 |
| 3 | | 1 | 0 | 1 |
| 4 | | 1 | 1 | 1 |

In Table I, column a+b+c+d represents the sum of inputs a+b+c+d, column other conditions represents the two different conditions in which the sum total of inputs a+b+c+d equals two, columns x1_out, n, and s1 represent different intermediate values within five-input/two-output adder 20.

Based on the result listed in Table I, the following equations hold true:

$$x1\_out = (a \text{ or } b) \text{ and } (c \text{ or } d);$$

$$s1 = (a \text{ and } b) \text{ or } (c \text{ and } d);$$

$$s1 \text{ xor } n = (a \text{ xor } b) \text{ xor } (c \text{ xor } d); \text{ and}$$

$$a+b+c+d = 2(x1\_out) + s1 + n \quad (1)$$

For the equations, "and" denotes a logical AND operation, "or" denotes a logical OR operation, and "xor" denotes a logical XOR (exclusive OR) operation. The $2(x1\_out)$ in equation (1) denotes $x1\_out$ being a higher significant position than $s1+n$. By defining $x2\_out$ and $s2$ as carry and save of $(s1+n+x1\_in)$, respectively, the following equations are formed:

$$\begin{aligned} x2\_out &= (s1 \text{ and } n) \text{ or } (s1 \text{ and } x1\_in) \text{ or } (n \text{ and } x1\_in) \quad (2)\\ &= (s1 \text{ and } n) \text{ or } (x1\_in \text{ and } (s1\_in \text{ or } n))\\ &= \{(\overline{s1 \text{ xor } n}) \text{ and } s1\} \text{ or } ((s1 \text{ xor } n) \text{ and } x1\_in); \end{aligned}$$

$$s2 = (s1 \text{ xor } n) \text{ xor } x1\_in; \text{ and}$$

$$s1 + n + x1\_in = 2(x2\_out) + s2$$

In a similar manner, let carry and sum be the carry and sum of $(s2+e+x2\_in)$, respectively, and the following equations are formed:

$$\text{carry} = \{(\overline{s2 \text{ xor } e}) \text{ and } e\} \text{ or } (s2 \text{ xor } e) \text{ and } x2\_in);$$

$$\text{sum} = (s2 \text{ xor } e) \text{ xor } x2\_in; \text{ and}$$

$$s2 + e + x2\_in = 2(\text{carry}) + \text{sum} \quad (3)$$

From equations (1), (2), and (3), $$\begin{aligned} a+b+c+d+e+x1\_in+x2\_in &= 2(x1\_out) + s1 + n + e + x1\_in + x2\_in\\ &= 2(x1\_out) + 2(x2\_out) + s2 + e + x2\_in\\ &= 2(x1\_out) + x2\_out + \text{carry}) + \text{sum} \end{aligned}$$

Thus, it is shown that five-input/two-output adder 20 generates $x1\_out$, $x2\_out$, carry, and sum according to their definitions in the corresponding equations.

By arranging the equations, it is shown that five-input/two-output adder 20 combines input values a, b, c, d, and e to generate a sum value and a carry value, as follows:

$$\begin{aligned} \text{sum} &= (s2 \text{ xor } e) \text{ xor } x2\_in\\ &= (s1 \text{ xor } n \text{ xor } x1\_in) \text{ xor } e \text{ xor } x2\_in\\ &= (a \text{ xor } b \text{ xor } c \text{ xor } d) \text{ xor } x1\_in \text{ xor } e \text{ xor } x2\_in\\ &= a \text{ xor } b \text{ xor } c \text{ xor } d \text{ xor } e \text{ xor } x1\_in \text{ xor } x2\_in\\ \text{carry} &= \{(\overline{s1 \text{ xor } n \text{ xor } x1\_in \text{ xor } e}) \text{ and } e\}\\ &\quad \text{ or } \{(s1 \text{ xor } n \text{ xor } x1\_in \text{ xor } e) \text{ and } x2\_in\};\\ &= \{(\overline{a \text{ xor } b \text{ xor } c \text{ xor } d \text{ xor } x1\_in \text{ xor } e}) \text{ and } e\}\\ &\quad \text{ or } \{(a \text{ xor } b \text{ xor } c \text{ xor } d \text{ xor } x1\_in \text{ xor } e) \text{ and } x2\_in\} \end{aligned}$$

As has been described, the present invention provides a five-input/two-output adder. The five-input/two-output adder of the present invention only have four levels of XOR delays on its critical path. It is understood by those skilled in the art that the five-input/two-output adder of the present invention can be utilized to implement various multipliers or fused multiply-adders within a processor. Furthermore, several five-input/two-output adders of the present invention can be concatenated to provide 5:2, 10:2, 15:2, 20:2 compressions.

Figure 3:
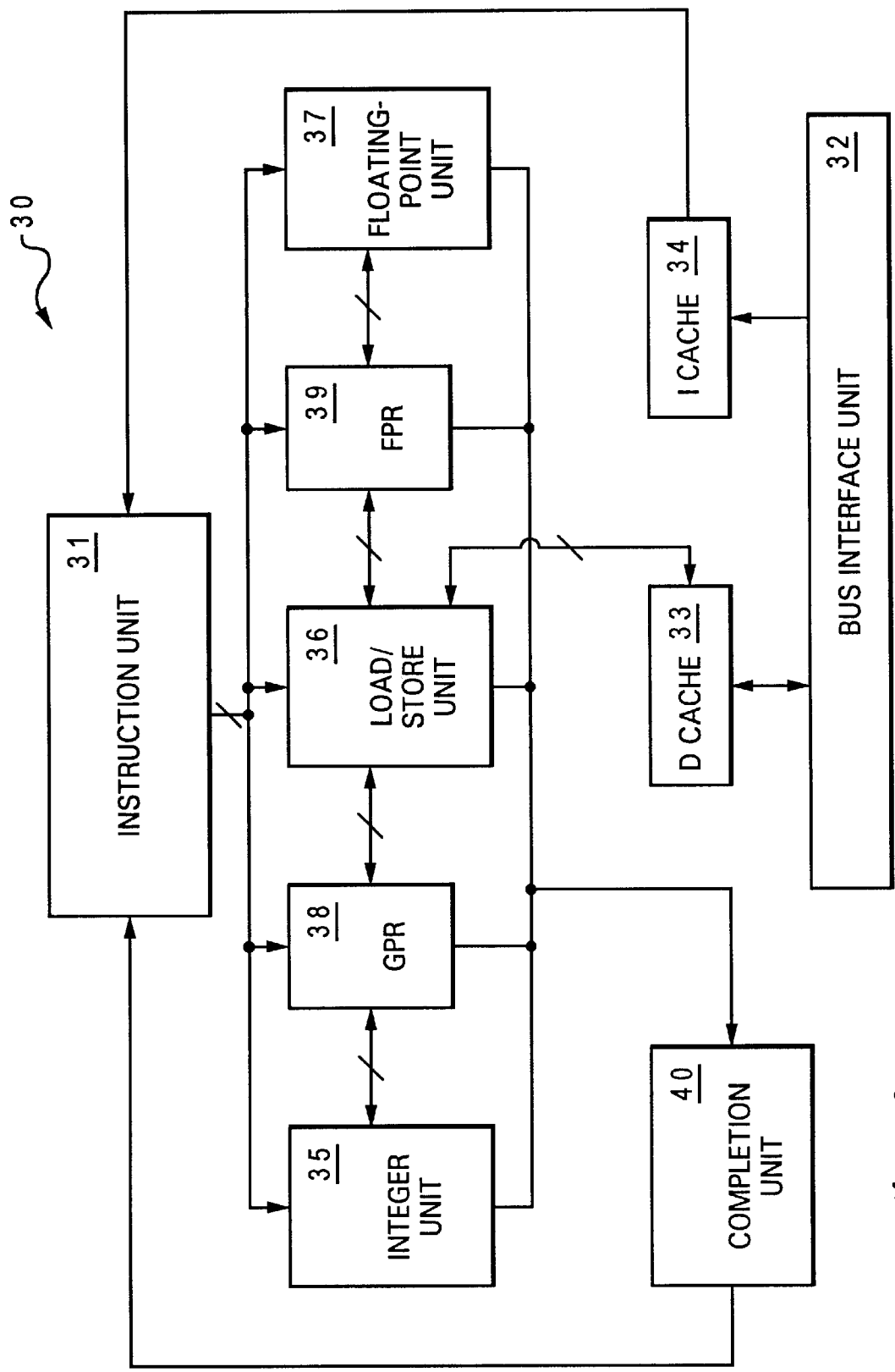
FIG. 3 is a block diagram of a processor in which a preferred embodiment of the present invention may be incorporated.

Referring now to FIG. 3, there is depicted a block diagram of a processor in which five-input/two-output adder 20 may be incorporated. Within a processor 30, a bus interface unit 32 is coupled to a data cache 33 and an instruction cache 34. Both data cache 33 and instruction cache 34 are high speed set-associative caches which enable processor 30 to achieve a relatively fast access time to a subset of data or instructions previously transferred from a main memory (not shown). Instruction cache 34 is further coupled to an instruction fetch unit 31 which fetches instructions from instruction cache 34 during each execution cycle.

Processor 30 also includes three execution units, namely, an integer unit 35, a load/store unit 36, and a floating-point unit 37. Five-input/two-output adders can be found within integer unit 35 and floating-point unit 37. Each of execution units 35–37 can execute one or more classes of instructions, and all execution units 35–37 can operate concurrently during each processor cycle. After execution has terminated, execution units 35–37 store data results to a respective rename buffer, depending upon the instruction type. Then, any one of execution units 35–37 signals a completion unit 40 that the instruction unit has been finished. Finally, instructions are completed in program order by transferring result data from the respective rename buffer to a general purpose register 38 or a floating-point register 39.

While the invention has been particularly shown and described with reference to a preferred embodiment, it will be understood by those skilled in the art that various changes in form and detail may be made therein without departing from the spirit and scope of the invention.

What is claimed is:

1. An adder comprising:

five data inputs;

a first carry-in input and a second carry-in input;

a sum output and a carry output; and only four levels of logic gates coupled between said five data inputs and said sum output and said carry output for combining values received at said five data inputs and generating a sum value and a carry value at said sum output and said carry output, respectively.

2. The adder of claim 1, wherein said sum value is generated by a xor b xor c xor d xor e xor $x1\_in$ xor $x2\_in$, wherein a, b, c, d, and e are input values to said five data inputs, wherein $x1\_in$ and $x2\_in$ are values from a previous stage to said first and second carry-in inputs.

3. The adder of claim 1, wherein said carry value is generated by $\{(\overline{a \text{ xor } b \text{ xor } c \text{ xor } d \text{ xor } x1\_in \text{ xor } e}) \text{ and } e\}$ or $\{(a \text{ xor } b \text{ xor } c \text{ xor } d \text{ xor } x1\_in \text{ xor } e) \text{ and } x2\_in\}$, wherein a, b, c, d, and e are input values to said five data inputs, wherein $x1\_in$ and $x2\_in$ are values from a previous stage to said first and second carry-in inputs.

4. The adder of claim 1, wherein said logic gates include XOR logic gates.

5. The adder of claim 1, wherein said adder further includes a first carry-out output and a second carry-out output.

6. A processor comprising:

an instruction unit, and an execution unit coupled to said instruction unit, wherein said execution unit has an adder that includes five data inputs;
a first carry-in input and a second carry-in input;
a sum output and a carry output; and
only four levels of logic gates coupled between said five data inputs and said sum output and said carry output for combining values received at said five data inputs and generating a sum value and a carry value at said sum output and said carry output, respectively.

7. The processor of claim 6, wherein said sum value is generated by a xor b xor c xor d xor e xor x1_in xor x2_in, wherein a, b, c, d, and e are input values to said five data inputs, wherein x1_in and x2_in are values from a previous stage to said first and second carry-in inputs.

8. The processor of claim 6, wherein said carry value is generated by {(a xor b xor c xor d xor x1_in xor e) and e} or {(a xor b xor c xor d xor x1_in xor e) and x2_in}, wherein a, b, c, d, and e are input values to said five data inputs, wherein x1_in and x2_in are values from a previous stage to said first and second carry-in inputs.

9. The processor of claim 6, wherein said logic gates include XOR logic gates.

10. The processor of claim 6, wherein said adder further includes a first carry-out output and a second carry-out output.

* * * * *